J. C. Brown,

Making Match Splints.

No. 2,168. Reissued Feb. 13, 1866.

Witnesses:
Amelia A. Ferrell.
Rufus Sanford.

Inventor:
J. C. Brown
Chas Gye
John E. Earle

AM. PHOTO-LITHO. CO. N.Y. (OSBORNE'S PROCESS)

UNITED STATES PATENT OFFICE.

JONATHAN C. BROWN, OF BROOKLYN, NEW YORK.

IMPROVEMENT IN MACHINES FOR CUTTING SPLINTS.

Specification forming part of Letters Patent No. 43,177, dated June 21, 1864; Reissue No. 2,071, dated September 12, 1865; Reissue No. 2,168, dated February 13, 1866.

*To all whom it may concern:*

Be it known that I, JONATHAN C. BROWN, of Brooklyn, in the county of Kings and State of New York, have invented a new and useful improvement in machinery for cutting splints or very thin pieces of wood differing from the paralleled rectangular form from cylindrical blocks; and I do hereby declare and ascertain my said invention as follows, referring to the accompanying drawings, which illustrates the same, in which—

Figure 1:
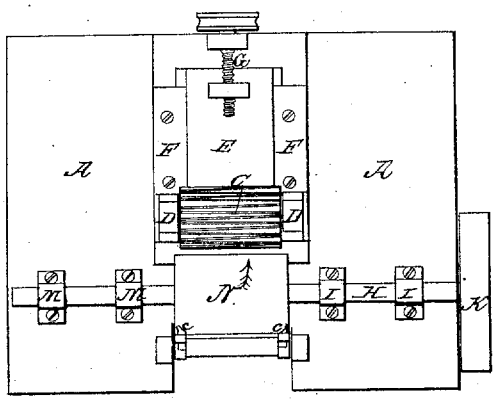
Figure 2:
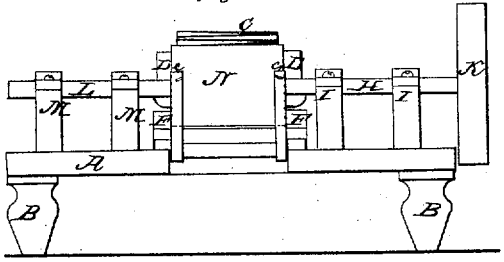
Figure 3:
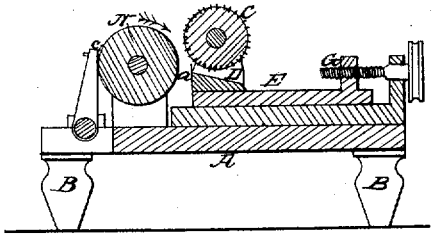

Figure 1 is a top plan of an apparatus for cutting tooth-picks or other articles that are broader at one end than the other. Fig. 2 is a front elevation of the same. Fig. 3 is a vertical longitudinal section through the machine.

The nature of my invention consists in cutting to a very slight depth into the surface of a cylinder of wood certain forms varying from parallel lines, and cutting off the thin lamina thus scored, the two cuts being gaged so as to exactly meet, and thus cut clean off the part scored, leaving the block smooth for the next cut, while the part removed is cut entirely off into the forms desired. Attempts have been made to cut in this way laths from a block, but it failed, as it is impossible to cut deep into a revolving cylinder of wood with radiating knives on a revolving shaft, for the knives must enter and leave the cylinder of wood at opposite angles, and will thus tear up and destroy the article cut off or mar it so as to render it practically useless, and it is found by actual trial of a machine thus devised that it will soon fill up the space between the cutters from the splinters from the wooden cylinder and stop the action of the machine; but I have found by numerous expensive experiments that I can cut from the surface of wooden cylinders light thin articles, such as tooth-picks and the like, in lines varying from the parallel and in parallel lines even, where the shaving is very thin, with radiating knives, and it is for my modification of the device which has hitherto proved a failure that I now ask for Letters Patent.

My machine is composed of substantially the following parts: Two mandrels, H and L, support and revolve a cylindrical block of wood, N, by means of a pulley, K, or other connection with the driving-power. The mandrels are supported in bearings M I, affixed to a bed-piece, A, elevated on legs B. Parallel with the mandrels a cylinder of knives is hung in suitable boxes in a sliding frame. The knives radiate from the center of the axis of the cylinder, but are placed thereon so as to cut the eccentric figures desired by placing the successive knives in different positions, according to the form desired to be cut, as in the case of tooth-picks, where each successive knife is placed at a different angle from the preceding one, as shown in the drawings.

The sliding frame E, in which the cylinder of knives is hung, has a stationary knife, *a*, affixed to it, and the two are set with the nicest accuracy, so as to relatively act upon the wood to produce the effect desired, which is to make the two cuts, which are at right angles to each other, exactly meet, and which is absolutely necessary to produce the delicate articles I propose to cut on my machine in merchantable condition.

The two knives are moved up to the work with absolute precision in exact accordance with each other by means of the screw G, the thickness to which all the revolving cutters score and the stationary cutter cuts being determined by the relative movement of the screw and the cylinder of wood.

I prefer to steam the wood before it is cut, although with some work and green wood it may be omitted.

Having thus fully described my invention, what I claim therein as new, and for which I desire to secure Letters Patent, is—

1. Cutting forms from wood in the manner described, when the knives on the revolving cylinder are set at different angles, as and for the purposes herein set forth.

2. Combining the knives, rotating and stationary in one frame, as herein set forth, so as to cause the two cuts that are at right angles to exactly meet, so as to cut the form off perfectly, and at the same time avoid scoring the wood deeper than the part removed, all as above specified.

J. C. BROWN.

Witnesses:

E. E. LEWIS.

J. J. GREENOUGH.